(12) United States Patent
Johnson

(10) Patent No.: US 7,029,512 B2
(45) Date of Patent: Apr. 18, 2006

(54) METHOD FOR PRODUCING CONCENTRATED VERMICOMPOST

(76) Inventor: Wesley M. Johnson, 64560 Redmond-Bend Hwy., Bend, OR (US) 97701

( * ) Notice: Subject to any disclaimer, the term of this patent is extended or adjusted under 35 U.S.C. 154(b) by 256 days.

(21) Appl. No.: 10/697,403

(22) Filed: Oct. 29, 2003

(65) Prior Publication Data

US 2005/0092049 A1    May 5, 2005

(51) Int. Cl.
*C05F 11/08* (2006.01)
(52) U.S. Cl. .................. 71/11; 71/8; 71/13; 71/15; 71/24; 71/64.01
(58) Field of Classification Search .................. 71/8, 71/11, 15, 24, 64.01, 13
See application file for complete search history.

(56) References Cited

U.S. PATENT DOCUMENTS

| | | | | |
|---|---|---|---|---|
| 4,108,625 A | * | 8/1978 | Okada | 71/9 |
| 4,147,256 A | * | 4/1979 | Kiss | 209/632 |
| 4,513,685 A | * | 4/1985 | Frijters et al. | 119/6.7 |
| 5,741,344 A | * | 4/1998 | Warkentin | 71/9 |
| 6,475,503 B1 | * | 11/2002 | Hahn | 424/405 |
| 2004/0065610 A1 | * | 4/2004 | Shankar et al. | 210/602 |

FOREIGN PATENT DOCUMENTS

| | | | |
|---|---|---|---|
| CN | 1051229 | * | 4/2000 |
| RU | 2107054 | * | 3/1998 |

* cited by examiner

*Primary Examiner*—Chhaya Sayala
(74) *Attorney, Agent, or Firm*—The Halvorson Law Firm

(57) ABSTRACT

Disclosed is a method for enhancing the concentration of vermicompost comprising the steps of liquefying and agitating a vermicompost feedstock; separating large bodies from the liquefied feedstock and further separating the remaining portion into first and second sub-portions; centrifugally separating the first sub-portion into light and heavy portions; returning the light portion to the liquefying and agitating step; separating biological vermicompost components from the second sub-portion and heavy portion using a biological filter; returning the liquid to the liquefying and agitating step; innoculating the biological vermicompost components with food and/or supplements; further enhancing the concentration of the biological vermicompost components by allowing the biological vermicompost components an effective amount of time to multiply and dry; and packaging the biological vermicompost components.

1 Claim, 1 Drawing Sheet

METHOD FOR PRODUCING CONCENTRATED VERMICOMPOST

FIELD OF THE INVENTION

Figure 1:
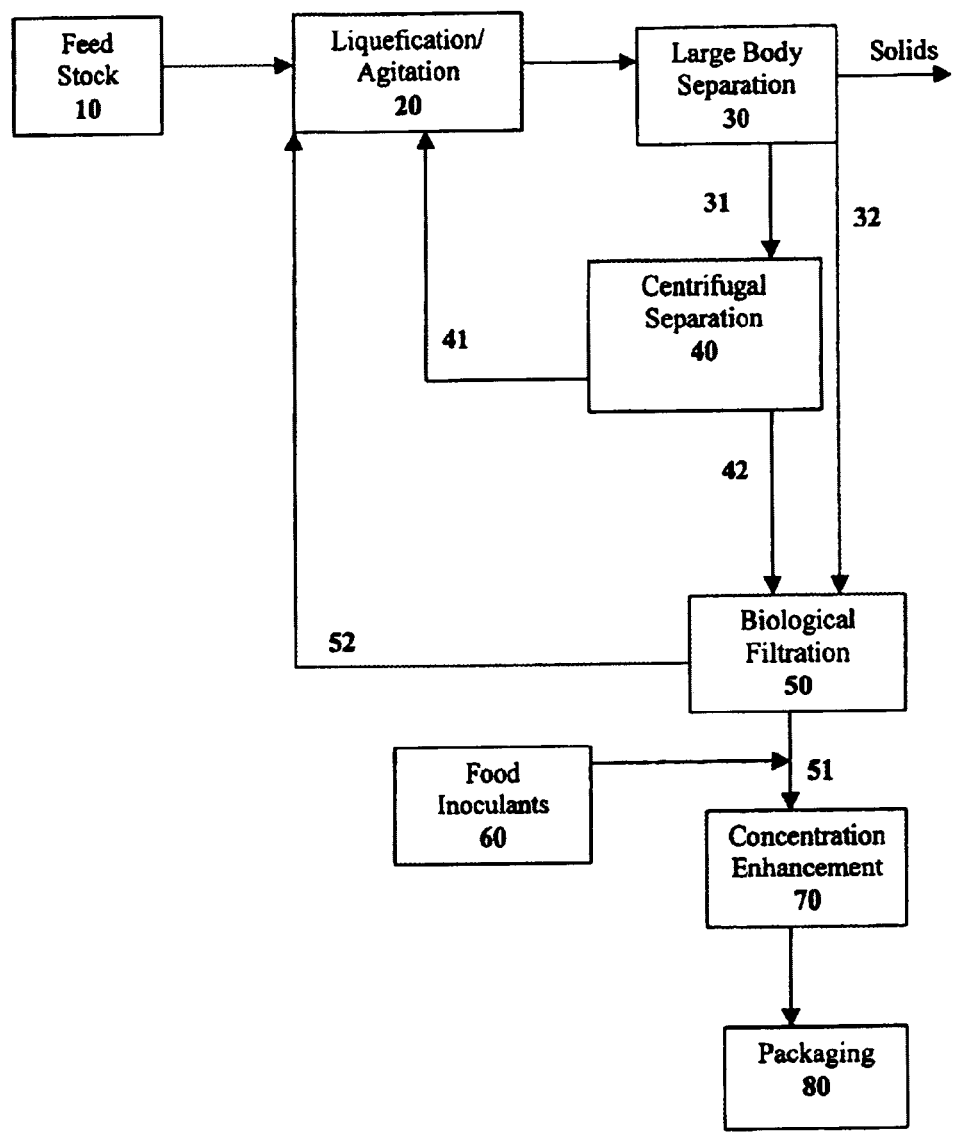

The present invention relates to methods for producing concentrated vermicompost. More specifically, the present invention relates to methods for producing concentrated vermicompost by dry flowable means

BACKGROUND

Earthworms comprise a group of invertebrates that live in the ground, eat decomposing organic material and produce a rich earthy substance referred to as castings. More technically, the worms are terrestrial annelid worms that are any of a family of numerous widely distributed hermaphroditic worms that move through the soil by means of state. Of these several varieties, the red worm has been found to be a hearty, rapidly multiplying organism capable of eating significant amounts of decomposing organic material.

Worm castings have been known as being very beneficial to promote plant growth for more than 100 years. Research by Ohio State University testing for the recommended application rate of worm castings for highest growth improvement recommended a 10%–20% mix. The rule given by Ohio State University to achieve these percentages was that a ½ inch layer worked into the soil will provide a 10% ratio and a 1-inch layer worked into the soil will provide a 20% ratio.

In order to make worm castings economically and industrially beneficial concentrating the beneficial properties is indicated. Traditionally, this has been done by washing the worm castings using a variety of different methods (worm tea). However, simple washing has not been found to yield the most benefit from the castings. Inclusion of solids to the worm tea produces vermicompost, which has additional benefits provided by the solids. Therefore, there is a present and continuing need for new and improved methods for producing concentrated vermicompost.

SUMMARY OF INVENTION

It is therefore an object of the present invention to provide a method for concentrating vermicompost comprising the steps of liquefying and agitating a vermicompost feedstock; separating large bodies from the liquefied feedstock and further separating the remaining portion into first and second sub-portions; centrifugally separating the first sub-portion into light and heavy portions; returning the light portion to the liquefying and agitating step; separating biological vermicompost components from the second sub-portion and heavy portion using a biological filter; returning the liquid to the liquefying and agitating step; innoculating the biological vermicompost components with food and/or supplements; further enhancing the concentration of the biological vermicompost components by allowing the biological vermicompost components an effective amount of time to multiply and dry; and packaging the biological vermicompost components.

The novel features that are considered characteristic of the invention are set forth with particularity in the appended claims. The invention itself, however, both as to its structure and its operation together with the additional object and advantages thereof will best be understood from the following description of the preferred embodiment of the present invention when read in conjunction with any accompanying drawings. Unless specifically noted, it is intended that the words and phrases in the specification and claims be given the ordinary and accustomed meaning to those of ordinary skill in the applicable art or arts. If any other meaning is intended, the specification will specifically state that a special meaning is being applied to a word or phrase. Likewise, the use of the words "function" or "means" in the Description of Preferred Embodiments is not intended to indicate a desire to invoke the special provision of 35 U.S.C. §112, paragraph 6 to define the invention. To the contrary, if the provisions of 35 U.S.C. §112, paragraph 6, are sought to be invoked to define the invention(s), the claims will specifically state the phrases "means for" or "step for" and a function, without also reciting in such phrases any structure, material, or act in support of the function. Even when the claims recite a "means for" or "step for" performing a function, if they also recite any structure, material or acts in support of that means of step, then the intention is not to invoke the provisions of 35 U.S.C. §112, paragraph 6. Moreover, even if the provisions of 35 U.S.C. §112, paragraph 6, are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

DETAILED DESCRIPTION OF PREFERRED EMBODIMENTS

The present invention is a useful method for producing concentrated vermicompost.

The method according to the present invention starts with batch of feed stock (illustrated in block 10 of FIG. 1). Feed stock, according to the present invention, is normal or organically enhanced soil containing worm castings.

The feed stock 10 are liquefied and broken down, illustrated in block 20. This is done by feeding the stock into a container having expanded metal baffles located on the inner surface of the container. The preferred container is shaped like an upside-down frustum (truncated cone). Sufficient fluid is added to the container to liquefy the feedstock. A sump pump, located at the bottom of the container agitates the liquefied feed stock. The expanded metal baffles serve to provide additional agitation elements thereby allowing the liquefied feedstock to be broken down into small components.

Once the liquefied feedstock has been sufficiently agitated it is pumped to a large body separation stage, illustrated as block 30. In the large body separation stage, 30, the liquefied feedstock are fed through a vibratory screener, which preferably uses a 40 mesh screen. Other sizes may be used and still fall within the scope of the present invention. The portion, large particles, that do not flow through the screen are either rejected or reused in the feedstock tank. The portion that flows through the vibratory screener is then split into first and second sub-portions, 31 and 32 respectively. The first sub-portion 31 is pumped to a centrifuge decanter 40 and the second 32 sub-portion is pumped to a biological filter 50.

The first sub-portion 31 that is pumped to the centrifuge decanter is centrifugally separated, illustrated as block 40. A lighter portion 41 is decanted and pumped back to the liquefication/agitation stage 20 while the remaining heavier portion 42 is pumped to the biological filter 50.

The heavy 42 decant from the centrifuge 40 and the second sub-portion 32 from the vibratory screener 30 are biologically filtered, illustrated in block 50. This is accomplished preferably using a 0.5 micron mesh to filter out solid (biological) elements 51 from liquid elements 52. The liquid elements 52 are returned to the liquefication/agitation stage 20 while the remaining solid biological elements 52 (vermicompost) are inoculated with food and supplements, block 60. The inoculation of the solid elements 51 aid the enhancement of the concentration of the biological elements 51.

In the enhancement stage, illustrated as block 70, the supplemented biologicals 52 are further concentrated by allowing an effective residence time sufficient enough allow the biologicals 51 to further multiply. The preferred residence time is 10 hours. The residence time is also useful for allowing the biologicals 51 to evaporatively reduce their water content (drydown).

Once the biologicals 51 are sufficiently enhanced and dried (concentrated vermicompost), they are placed into packaging, illustrated in block 80, preferably biodegradable bags such that the entire package, including vermicompost, may be applied to the field to be treated. In addition to saving application time, use of biodegradable bags reduces unwanted wasted in the method.

The preferred embodiment of the invention is described above in the Drawings and Description of Preferred Embodiments. While these descriptions directly describe the above embodiments, it is understood that those skilled in the art may conceive modifications and/or variations to the specific embodiments shown and described herein. Any such modifications or variations that fall within the purview of this description are intended to be included therein as well. Unless specifically noted, it is the intention of the inventor that the words and phrases in the specification and claims be given the ordinary and accustomed meanings to those of ordinary skill in the applicable art(s). The foregoing description of a preferred embodiment and best mode of the invention known to the applicant at the time of filing the application has been presented and is intended for the purposes of illustration and description. It is not intended to be exhaustive or to limit the invention to the precise form disclosed, and many modifications and variations are possible in the light of the above teachings. The embodiment was chosen and described in order to best explain the principles of the invention and its practical application and to enable others skilled in the art to best utilize the invention in various embodiments and with various modifications as are suited to the particular use contemplated.

What is claimed is:

1. A method for concentrating vermicompost comprising the steps of
   a. liquefying and agitating a vermicompost feedstock;
   b. separating large bodies from the liquefied feedstock and further separating the remaining portion into first and second sub-portions;
   c. centrifugally separating the first sub-portion into light and heavy portions;
   d. returning the light portion to the liquefying and agitating step;
   e. separating biological vermicompost components from the second sub-portion and heavy portion using a biological filter;
   f. returning the liquid to the liquefying and agitating step;
   g. innoculating the biological vermicompost components with food and/or supplements;
   h. further enhancing the concentration of the biological vermicompost components by allowing the biological vermicompost components an effective amount of time to multiply and dry; and
   i. packaging the biological vermicompost components.

* * * * *